United States Patent [19]
Hayashida et al.

[11] Patent Number: 5,460,879
[45] Date of Patent: Oct. 24, 1995

[54] LAMINATE FILM FOR WRAPPING

[75] Inventors: Haruo Hayashida; Akihiro Ichige, both of Chiba; Kozo Kotani, Osaka; Toshio Kawakita, Osaka; Takanori Kume, Osaka; Teruaki Yoshida, Chiba; Takeshi Yamada, Osaka; Yufu Sato, Chiba, all of Japan

[73] Assignee: Sumitomo Chemical Co., Ltd., Osaka, Japan

[21] Appl. No.: 93,875

[22] Filed: Jul. 20, 1993

[30] Foreign Application Priority Data

Jul. 22, 1992 [JP] Japan .................. 4-195213
Apr. 7, 1993 [JP] Japan .................. 5-080584

[51] Int. Cl.$^6$ ................................................ B32B 7/12
[52] U.S. Cl. .................... 428/349; 428/500; 428/516; 428/910
[58] Field of Search ...................... 428/516, 500, 428/349, 910

[56] References Cited

U.S. PATENT DOCUMENTS

| | | | |
|---|---|---|---|
| 5,030,506 | 7/1991 | Yamawaki et al. | 428/349 |
| 5,089,321 | 2/1992 | Chum et al. | 428/218 |

FOREIGN PATENT DOCUMENTS

| | | |
|---|---|---|
| 0377121 | 7/1990 | European Pat. Off. . |
| 2635312 | 2/1990 | France . |
| 2027720 | 2/1980 | United Kingdom . |
| WO9003414 | 4/1990 | WIPO . |
| WO9214784 | 9/1992 | WIPO . |

OTHER PUBLICATIONS

Derwent Publication NO. 86–323307.
Derwent Publication No. 84–143559.
Patent Abstracts of Japan, vol. 011, No. 349.

*Primary Examiner*—Edith Buffalow
*Attorney, Agent, or Firm*—Sughrue, Mion, Zinn, Macpeak & Seas

[57] ABSTRACT

A laminate film for wrapping which comprises a layer comprising (A) an ethylene-α-olefin copolymer having a coefficient of variation of composition distribution (Cx) represented by equation shown below of 0.40 or less and having an ethylene content of 50 mol % or more and at least one layer of a different kind;

$$Cx = \sigma/SCB_{ave}$$

wherein $\sigma$ is a standard deviation of composition distribution (1/1000 C), and $SCB_{ave}$ is an average of the number of short chain branchings per 1000 C (1/1000 C).

The film is safe and hygienic, less odorous and excellent in transparency, mechanical strength, softness, and low-temperature heat sealing properties and is therefore suitable to automatic wrapping, particularly stretch-wrapping.

5 Claims, 1 Drawing Sheet

LAMINATE FILM FOR WRAPPING

FIELD OF THE INVENTION

This invention relates to a laminate film for wrapping and more particularly to a laminate wrapping film having excellent hygienic safety, low odor development, transparency, mechanical strength, softness, and low-temperature sealing properties as well as suitability to automatic wrapping.

BACKGROUND OF THE INVENTION

There are various wrapping techniques using a film, for example, bag sealing, overwrapping, stretch-wrapping, skin wrapping, and the like, which are chosen so as to take full advantage of the film used. In the field of these wrapping techniques, a single layer film using a general-purpose resin, such as polyethylene, polypropylene, and polyvinyl chloride, has been widely employed.

However, cases are increasing in which these conventional films fail to cope with the recent increase or diversity of demands for wrapping films and changes of social needs. For example, in the field of stretch-wrapping of foods, such as vegetables, fruits, fish, meats, and cooked foods, either as they are or placed on a plastic tray, with a wrapping film, use of ethylene resins such as low-density polyethylene resins and ethylene-vinyl acetate copolymer resins has been studied with keenness as substitutes for conventionally employed polyvinyl chloride films from the considerations of safety and environmental conservation. However, films solely comprising a low-density polyethylene resin cannot satisfy all the requirements demanded, e.g., self-tack, low-temperature sealing properties, softness, and mechanical strength. Films of an ethylene-vinyl acetate copolymer resin, with its vinyl acetate content, molecular weight, etc., being properly selected, would be freed form the above-described problems associated with the low-density polyethylene resin films to some extent. However, when they are used in stretch-wrapping of sharp-edged foods or trays, they are easily torn at the sharp edge.

For the purpose of satisfying all the requirements as a wrapping film, a laminate film composed of a specific intermediate layer having laminated on both sides thereof an ethylene-vinyl acetate copolymer resin layer has been proposed as disclosed in, for example, JP-A-61-44635 (the term "JP-A" as used herein means an "unexamined published Japanese patent application"). However, these laminate films still involve disadvantages, such as development of an acetic acid odor or poor balance between softness and cutting properties causing reduction in operation efficiency on an automatic wrapping line.

SUMMARY OF THE INVENTION

An object of the present invention is to provide a wrapping film, and particularly a stretch-wrapping film, which has excellent properties needed in automatic wrapping, i.e., moderate slip, self-tack, heat sealing properties, and softness, and also has excellent low odor development, transparency, and mechanical strength.

The present inventors have conducted extensive investigations on a wrapping film which is less odorous and possesses transparency, satisfactory mechanical strength, and low-temperature heat sealing properties while retaining other wrapping properties conventionally achieved. As a result, it has been found that a laminate film having a layer comprising a specific ethylene-α-olefin copolymer exhibits excellent performance properties as a wrapping film. The present invention has been completed based on this finding.

The laminate film for wrapping according to the present invention comprises a layer comprising an ethylene-α-olefin copolymer having a coefficient of variation of composition distribution (Cx) represented by equation (1) shown below of 0.40 or less and having an ethylene content of 50 mol % or more, and at least one layer of a different kind;

$$Cx = \sigma/SCB_{ave} \quad (1)$$

wherein $\sigma$ is a standard deviation of composition distribution (1/1000 C), and $SCB_{ave}$ is an average of the number of short chain branchings per 1000 C (1/1000 C).

The wrapping film of the present invention is especially suitable for stretch-wrapping.

DETAILED DESCRIPTION OF THE INVENTION

Figure 1:
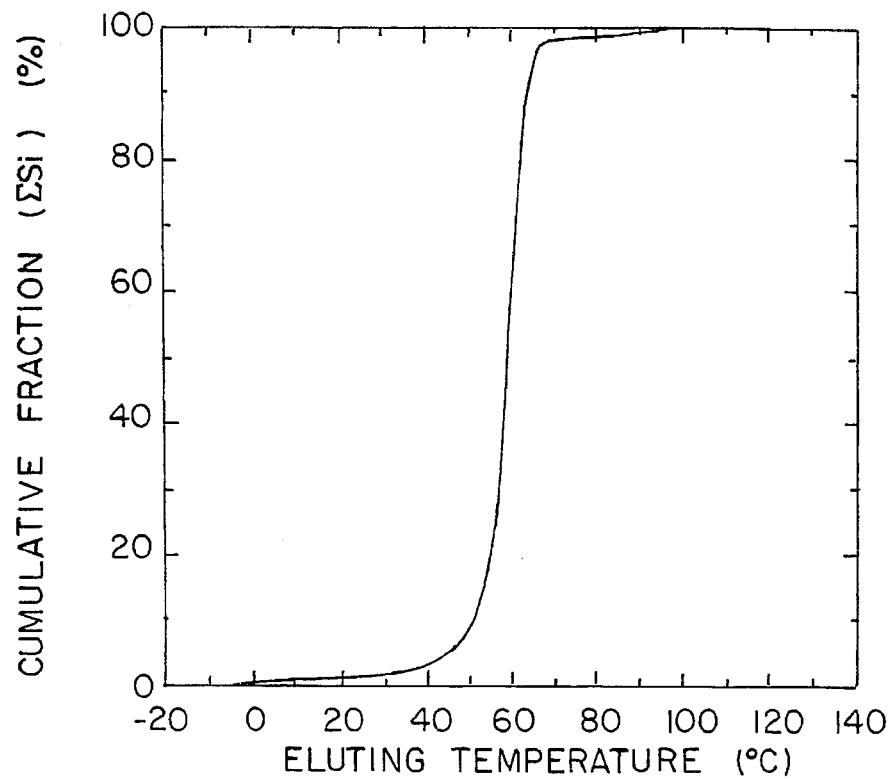
FIG. 1 is a graph of cumulative fraction vs. eluting temperature of ethylene-butene-1 copolymer (A-1) used in Example 1.

Ethylene-α-olefin copolymer (A) which can be used in the present invention has a coefficient of variation in composition distribution (Cx) of 0.40 or less, preferably 0.30 or less, and more preferably 0.25 or less.

The ethylene content of copolymer (A) is at least 50 mol %, and preferably 70 mol % or more., Copolymer (A) preferably contains ($a_1$) from 2 to 20 mol % of an α-olefin having from 3 to 10 carbon atoms, has ($a_2$) a density of from 0.870 to 0.915 g/cm$^3$, and shows ($a_3$) its maximum peak of fusion at 60° C. or higher and less than 100° C. as measured with a differential scanning calorimeter (DSC), with the proportion of the heat of fusion at that peak in the total heat of fusion being at least 0.8.

With respect to property ($a_1$), the content of a $C_{3-10}$ α-olefin is preferably from 2 to 20 mol %. From the standpoint of the balance between transparency and rigidity of the laminate film, the $C_{3-10}$ α-olefin content is more preferably from 4 to 10 mol %. Specific examples of the $C_{3-10}$ α-olefin are propylene, butene-1, pentene-1, hexene-1,4-methyl-pentene-1, octene-1, and mixtures thereof. Of these α-olefins, propylene is relatively less effective, and those having 4 or more carbon atoms are preferred. Among others, butene-1, hexane-1,4 -methyl-pentene-1, and octene-1 are more preferred from the standpoint of not only availability but the quality of the resulting copolymer.

With respect to property (a2), copolymer (A) preferably has a density of from 0,870 to 0,915 g/cm$^3$. From the standpoints of surface conditions and low-temperature heat sealing properties of the resulting laminate film, a density of from 0.890 to 0,910 g/cm$^3$ is more preferred.

With respect to property ($a_3$), copolymer (A) preferably shows its maximum peak of fusion at a temperature of 60° C. or higher and less than 100° C. as measured with DSC, with the proportion of the heat of fusion at that peak in the total heat being at least 0.8, from the standpoint of transparency and impact strength of the resulting laminate film. A plurality of peaks of fusion may be observed within the above-specified temperature range.

In the present invention, ethylene-α-olefin copolymer (A) is used with the purpose of improving the balance among low odor development, softness, transparency, and mechanical strength. Copolymer (A) can be obtained by, for example, the process described in JP-A-2-77410. That is, copolymer (A) is prepared by copolymerizing ethylene and an α-olefin having 3 to 10 carbon atoms at an ethylene/α-olefin molar ratio of from 35/65 to 60/40 in a hydrocarbon solvent in the presence of a catalyst system comprising (i) a vanadium compound represented by formula $VO(OR)_nX_{3-n}$, wherein R represents a hydrocarbon group; X represents a halogen atom; and $0<n<3$, as a transition metal component, (ii) an organoaluminum compound represented by formula $R'_mAlX_{3-m}$, wherein R' represents a hydrocarbon group; X represents a halogen atom; and $1<m<3$, as an organometallic component, and (iii) an ester compound represented by formula $R''(C=O)OR'''$, wherein R'' represents an organic group having from 1 to 20 carbon atoms, partly or wholly substituted with a halogen atom; and R''' represents a hydrocarbon group having from 1 to 20 carbon atoms, as a third component (hereinafter referred to as M), at an Al/V molar ratio of 2.5 or more and an M/V molar ratio of 1.5 or more and at a polymerization temperature of from 40° to 80° C. in a system comprising a hydrocarbon solvent-insoluble polymer (slurry phase) and a hydrocarbon solvent-soluble polymer (solution phase). Copolymer (A) can also be obtained in the same manner as described above, wherein a vanadium compound obtained by reacting vanadium trichloride with an alcohol is used as transition metal component (i).

At least one layer of a different kind which is laminated on the layer of copolymer (A) preferably includes a layer comprising a thermoplastic resin or a composition thereof, and more preferably an olefin type thermoplastic resin or a composition thereof.

Specific examples of suitable olefin type thermoplastic resins or compositions thereof include low-density polyethylene (LDPE), linear low-density polyethylene (LLDPE), very-low-density polyethylene (VLDPE), high-density polyethylene (HDPE); ethylene copolymers, e.g., an ethylene-vinyl acetate copolymer (EVA) or a saponification product thereof (EVOH), an ethyleneethyl acrylate copolymer (EEA), an ethylene-methyl methacrylate copolymer (EMMA), an ethylene-glycidyl methacrylate copolymer (EGMA), an ethylene-maleic anhydride copolymer (EMAH), and an ionomer resin; polypropylene, a propylene-ethylene copolymer, a propylene-butene-1 copolymer, a propylene-ethylene-butene-1 copolymer (random or block copolymer); and mixtures thereof.

Among others, copolymers (B) to (G) shown below, and particularly copolymers (B) to (D), are preferred as materials for the other layers to be laminated.

(B) Propylene-α-olefin copolymers having ($b_1$) a content of an α-olefin having 4 or more carbon atoms of from 8 to 35 mol %, ($b_2$) an ethylene content of 5 mol % or less, and ($b_3$) a cold xylene-soluble matter (hereinafter referred to as CXS) of from 10 to 70% by weight.

The $C_{\geq 4}$ α-olefin content in propylene-α-olefin copolymer (B) is preferably from 8 to 35 mol %, and more preferably from 10 to 25 mol % from the standpoint of the balance between softness and surface conditions of the resulting film.

Examples of the $C_{\geq 4}$ α-olefin are butene-1, pentene-1, hexane-1,4-methyl-pentene-1, octene-1, and combination thereof. Where copolymer (B) is prepared by gas phase polymerization, butene-1 is preferred because-it is hardly liquefied and therefore allows to increase the partial pressure.

The ethylene content of propylene-α-olefin copolymer (B) is preferably 5 mol % or less, and more preferably 3 mol % or less from the standpoint of less variation in film transparency with the passage of time.

The CXS of propylene-α-olefin copolymer (B) is preferably from 10 to 70% by weight, and more preferably from 12 to 65% by weight in view of the balance of softness and surface conditions of the resulting film.

Propylene-α-olefin copolymer (B) having the above-described properties can be prepared by any polymerization technique, such as solution polymerization or gas phase polymerization, using a Ziegler-Natta catalyst generally employed for stereoregular polymerization of α-olefins, i.e., a catalyst system comprising Group IV to VIII transition metal compound and Group I to II typical metal organic compound in the Periodic Table and, for preference, an electron-donating compound as a third component. For example, the processes disclosed in JP-A-63-19255 (Example 1) and JP-A-60-76515 can be adopted.

If desired, propylene-α-olefin copolymer (B) may be used as a blend with an ethylene-propylene copolymer having an ethylene content of from 3 to 10 mol % or a polyethylene resin as long as the effects of the present invention are not impaired. The terminology "polyethylene resin" as used herein means a conventional ethylene-based polymer, such as high-pressure polyethylene and a copolymer of ethylene and an α-olefin having 4 or more carbon atoms.

(C) propylene-ethylene copolymer having ($c_1$) an ethylene content of from 3 to 12 mol % and ($c_2$) a minimum peak of fusion at a temperature of 130° C. or more as measured with DSC.

The ethylene content of propylene-ethylene copolymer (C) is preferably from 3 to 12 mol %, and more preferably from 4 to 7 mol %, from the standpoint of film softness and prevention of stickiness.

(D) Ethylene-butene-1 copolymer having ($d_1$) an ethylene content of 50 mol % or more, ($d_2$) a density of from 0.870 to 0.910 g/cm3, ($d_3$) a peak of fusion at a temperature of 100° C. or more as measured with DSC, and ($d_4$) an CXS of from 5 to 50% by weight.

The ethylene content of ethylene-butene-1 copolymer (D) is preferably 50 mol % or more, and more preferably 70 mol % or more. The density of copolymer (D) is preferably from 0,870 to 0,910 g/cm$^3$, and more preferably from 0,890 to 0,910 g/cm$^3$, from the consideration of balance of the physical properties. From the standpoint of prevention of holes on heat sealing, ethylene-butene-1 copolymer (D) preferably shows its minimum peak of fusion at 100° C. or higher in the DSC thermogram in temperature rise. A plurality of peaks of fusion may be observed within the above-specified temperature range. The CXS is preferably from 5 to 50% by weight, and more preferably from 20 to 45% by weight, in view of softness and processability of the resulting film. The CXS of copolymer (D) has a high content of components having a weight average molecular length of from 100 to 900 nm.

(E) Ethylene-butene-1 copolymer (E) having ($e_1$) an ethylene content of 50 mol % or more, ($e_2$) a density of from more than 0,910 to 0,935 g/cm$^3$, and ($e_3$) a minimum peak of fusion at a temperature of 100° C. or more as measured with DSC.

(F) Ethylene-α-olefin copolymer having ($f_1$) an ethylene content of 50 mol % or more, ($f_2$) an α-olefin having from 6 to 12 carbon atoms, ($f_3$) a density of from 0.870 to 0.935 g/cm$^3$, ($f_4$) a peak of fusion at a temperature of 100° C. or more as measured with DSC, and ($f_5$) a CXS of from 1 to 25% by weight.

(G) Other ethylene copolymers (G) having an ethylene content of 50 mol % or more, such as EEA, EMMA, and EGMA.

The wrapping film of the present invention comprises at least two layers, one of which is a layer comprising ethylene-α-olefin copolymer (A). The total thickness of the laminate film is preferably from 6 to 40 μm, with the thickness of the layer of copolymer (A) being preferably at least 1 μm.

If desired, for example, for the purpose of controlling stretchability, self-tack, etc., copolymer (A) or other copolymers (B) to (G), etc., may contain a fatty acid ester between an aliphatic alcohol having from 1 to 12 carbon atoms and a fatty acid having from 10 to 22 carbon atoms, etc.

The laminate film of the present invention can be produced by heat laminating a plurality of films separately prepared by blown-film extrusion, T-die extrusion or the like film forming technique or by co-extrusion of two different layers or three layers of two different kinds by blown-film extrusion or T-die extrusion. It is also possible that any one of the layers is formed and the other layer(s) is laminated thereon by a conventional method, such as extrusion laminating.

Where the wrapping film is required to have shrinkability, the laminate film is preferably stretched either uniaxially or biaxially. Uniaxial stretching is preferably conducted by conventional roll stretching. Biaxial stretching may be conducted either by successive stretching in which stretching in one direction is followed by stretching in another direction or by simultaneous stretching such as tubular stretching.

The present invention will now be described in greater detail with reference to the Examples, but it should be understood that the present invention is not construed as being limited thereto. All the percents are by weight unless otherwise indicated.

Physical properties of the copolymers or films prepared were measured in accordance with the following test methods.

1) Butene-1 Content in Copolymer (A):
Measured from a material balance. The results obtained received confirmation by quantitative determination from the characteristic absorption at 770 cm$^1$ with an infrared spectrophotometer.

2) Ethylene Content in Copolymers (B) to (D):
Measured from a material balance. The results obtained for copolymer (C) received confirmation by quantitative determination from the characteristic absorption at 732 cm$^1$ and 720 cm$^1$ with an infrared spectrophotometer. The measurements with an infrared spectrophotometer were made with reference to a calibration curve prepared by dosimetry of a $^{14}$C-labeled ethylene copolymer.

3) Cold-Xylene Soluble Matter (CXS):
A polymer weighing 5 g was dissolved in 500 ml of boiling xylene followed by slowly cooling to room temperature. After allowing to stand in a bath kept at 20° C. for 4 hours, the solution was filtered, and the filtrate was concentrated to dryness, dried, and weighed.

4) Melt Flow Rate (MFR):
Measured in accordance with JIS K6760 as for ethylene-α-olefin copolymer (A) and ethylene-butene-1 copolymer (D) or JIS K6758 as for propylene-α-olefin copolymer (B) and propylene-ethylene copolymer (C).

5) Density:
Measured according to JIS K6760. Measurements were made after annealing in boiling water (100° C.) for 1 hour.

6) Differential Thermal Analysis with DSC:
6-1) For ethylene-α-olefin copolymer (A) and ethylene-butene-1 copolymer (D):
Model DSC-7 manufactured by Perkin-Elmer Co. was used. A specimen weighing about 10 mg cut out of a hot-pressed sheet having a thickness of about 0.5 mm was put in a sample pan, preheated at 150° C. for 5 minutes, cooled to 40° C. at a rate of 10° C./min, maintained at that temperature for 5 minutes, and then heated up to 150° C. at a rate of 10° C./min to prepare a thermogram.

6-2) For propylene-α-olefin copolymer (B) and propylene-ethylene copolymer (C):
DSC-7 was used. A specimen weighing about 10 mg cut out of a hot-pressed sheet having a thickness of about 0.5 mm was put in a sample pan, preheated at 200° C. for 5 minutes, cooled to 40° C. at a rate of 10° C./min, maintained at that temperature for 5 minutes, and then heated up to 180° C. at a rate of 20° C./min to prepare a thermogram.

7) Haze (%):
Measured according to ASTM D1003. The smaller the value, the higher the transparency.

8) Tensile Strength at Break kg/cm$^2$) and Tensile Elongation (%):
Measured in both machine direction (MD) and transverse direction (TD) in accordance with JIS K6781.

9) Young's Modulus (kg/cm2):.
Measured in both MD and TD according to ASTM D882 under the following conditions. The smaller the value, the higher the softness.

Specimen: 20 mm wide and 120 mm long strip

Distance between chucks: 50 mm

Pulling speed: 5 mm/min

10) Self-Tack (kg/12 cm$^2$):
Two films were superposed with an overlap of 30 mm×40 mm. After imposing a load of 500 g on the overlap for 30 minutes, the films were pulled apart by means of a Schopper tensile tester at a pulling speed of 200 mm/min to measure a peel strength under shear.

11) Heat-Sealing Strength (kg/15 mm):
Two films were superposed and heat sealed over a seal width of 10 mm at 100° C. and under a seal area pressure of 1.0 kg/cm$^2$ for 1.0 second by means of a heat sealer manufactured by Tester Sangyo Co., Ltd. A 15 mm wide strip was cut out across the seam, and a 180° peel strength was measured with a Schopper tensile tester at a pulling speed of 200 mm/min.

12) Coefficient of Variation of Composition Distribution (Cx):
Construction of Testing Equipment:
On-line degasser: Model ERC-3322 manufactured by Elmer Co.
Pump: Model CCPM manufactured by Toso Co., Ltd.
Electric switching valve: Model MV-8011 manufactured by Toso Co., Ltd.
Pouring valve: Model M3-1/16-V6-P-SS manufactured by Valco Co., Ltd.
Column oven: Model SSP-43CR-43CR-A manufactured by Kato Co., Ltd.
Detector: Model FT/IR-1760X manufactured by Perkin-Elmer Co.
Fraction collector: Model MV8010K manufactured by Toso Co., Ltd.
System controller: Model SC-8010 manufactured by Toso Co., Ltd.

Test Conditions:
 Solvent: o-dichlorobenzene
 Column: 21 mm diameter×150 mm length
 Filler: glass beads of 500 to 700 μm
 Sample concentration: 1%
 Amount of sample solution poured: 6 ml
 Flow rate of liquid: 2.5 ml/min
 Steps of eluting temperature: 38 steps from −10° C. to 105° C.
 Eluting temperature (Ti): −10, 0, 5, 10, 14, 18, 21, 24, 27, 30, 33, 36, 39, 42, 45, 48, 51, 54, 57, 60, 63, 66, 69, 72, 75, 78, 80, 82, 84, 86, 88, 90, 92, 94, 96, 98, 101, and 105 (°C.)
 The flow path down the column oven was heated at 145° C. Before passing the solvent through the column, the solvent was preheated in a flow channel of about 20 ml provided in the column oven.

FT/IR Condition:
 Resolving power: 8 cm$^{-1}$
 Flow cell: KBr-made window; cell length: 0.5 mm; heated solution flow cell.

Method of Measurement:
(i) Preparation of Sample Solution:
 A solution of a sample in a prescribed concentration was prepared and heated at 145° C. for 4 hours to dissolve the sample.
(ii) Procedure of Temperature Rise Fractionation:
 1. A sample solution heated to 145° C. was positioned at the center of the column set in the column oven heated at 145° C. by means of a pouring valve and a pump.
 2. The temperature of the column oven was lowered from 145° C. to 90° C. at a cooling rate of 0.92° C./min and from 90° C. to −10° C. at a cooling rate of 0.25° C./min while retaining the sample solution at the center of the column.
 3. The column was kept at −10° C. for 2 hours.
 4. A solvent was passed into the FT/IR flow cell through the flow path by-passing the column by means of a pump, and an FT/IR background was measured (number of integrations: 50). After the background measurement, the pump was stopped.
 5. The solvent was made ready to flow through the column, and FT/IR measurement was started simultaneously with making the solvent to flow through the column by the pump.
 Solvent feed time: 25 min
 FT/IR integrating time: 25 min (number of integrations: 625)
 6. The FT/IR spectrum obtained was saved in a floppy disc.
 7. After the solvent passed, the column oven temperature was elevated to the next eluting temperature and maintained for 15 minutes.
 8. The cycle consisting of the above procedures 4 to 7 was repeated for every eluting temperature.
 9. Finally, the column oven temperature was raised up to 145° C., and a solvent was passed for 25 minutes by means of the pump.

Data Processing:
 1. The peak area ($S_1$) of the FT/IR spectrum within an IR wave number of from 2983 to 2816 cm$^{-1}$ was obtained.
 2. Corrections for the irregular intervals of eluting temperatures were made according to equations (2) and (3) shown below.

$$H_i=(\Sigma S_i-\Sigma S_{(i-1)})/(T_i-T_{(i-1)}) \qquad (2)$$

$$RHi=H_i/\Sigma H_i \times 100(\%) \qquad (3)$$

wherein RHi: relative concentration

3. The composition was calculated according to equation (4):

$$SCBi=59.70-0.599 \times Ti \ (1/1000 \ C) \qquad (4)$$

wherein Ti: eluting temperature; SCBi: the number of short chain branchings per 1000 C.
 4. SCBi was plotted against RHi to obtain a composition distribution curve (see FIG. 2).
 5. From the composition distribution curve was obtained Cx representing the breadth of the distribution according to equations (5) and (6):

$$SCB_{ave}=(SCBi \times RHi)/\Sigma RHi \ (1/1000 \ C) \qquad (5)$$

$$Cx=\sigma/SCB_{ave} \qquad (6)$$

wherein σ: standard deviation of composition distribution (SCBi)

EXAMPLE 1

(1) Preparation of Ethylene-Butene-1 Copolymer (A): An n-hexane solution of ethylene and an n-hexane solution of butene-1 each at a prescribed concentration were continuously fed to the lower part of a 200 l stirred tank reactor at the respective constant feed rate with the total n-hexane feed rate being set at 80 kg/hr. Through a separate feed line, vanadyl trichloride, ethylaluminum sesquichloride, and n-butyl perchlorocrotonate were continuously fed thereto at the respective constant feed rate. The inner temperature of the reactor was maintained at 40° C. or 50° C. by circulating cooling water through a jacket around the reactor. The polymerization liquid was continuously withdrawn from the upper part of the reactor so that the reactor might be always filled up with the liquid. A small amount of methanol was added to the polymerization system to stop the reaction. After removal of the monomers and washing with water, the solvent was recovered by stripping with steam to take out a solid polymer, which was then dried under reduced pressure at 80° C. to obtain ethylene-butene-1 copolymer (A-1) or (A-2). The polymerization conditions, the copolymer production rate, and physical properties of the resulting copolymers are shown in Table 1 below.

Figure 2:
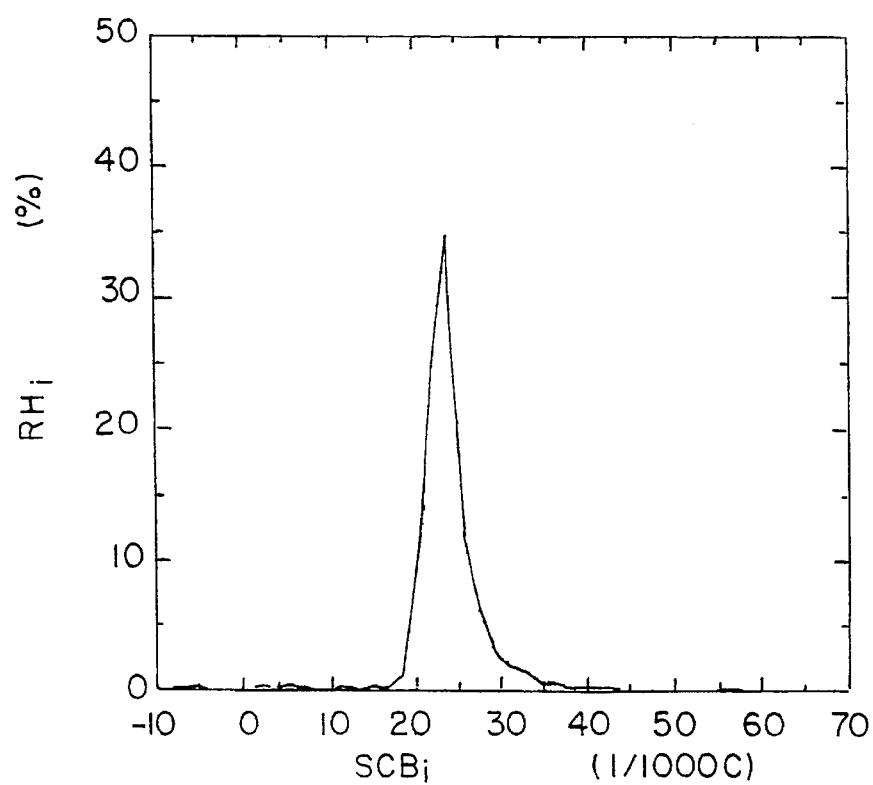
FIG. 2 is a graph showing the relationship of $SCB_i$ and $RH_i$ as calculated from FIG. 1.

The cumulative peak area (ΣSi) vs. eluting temperature (Ti) of copolymer (A-1) is shown in FIG. 1. The relationship between SCBi (the number of short chain branchings per 1000 C) and RHi (relative concentration) calculated from FIG. 1 according to equations (2) to (4) is shown in FIG. 2. The coefficient of variation of composition distribution Cx as used in the present invention is to represent the breadth of the curve of FIG. 2.

TABLE 1

|  | Copolymer (A) | |
|---|---|---|
|  | A-1 | A-2 |
| Polymerization Conditions: | | |
| Ethylene feed rate (kg/hr) | 1.4 | 3.5 |
| Butene-1 feed rate (kg/hr) | 0.6 | 3.1 |
| Vanadyl trichloride (g/hr) | 0.002 | 0.07 |
| Ethylaluminum sesquichloride feed rate (g/hr) | 1.2 | 1.5 |
| n-Butyl perchlorocrotonate feed rate (g/hr) | 0.72 | 0.4 |
| Reaction temperature (°C.) | 40 | 50 |
| Copolymer production rate (kg/hr) | 1.4 | 1.8 |

TABLE 1-continued

|  | Copolymer (A) | |
|---|---|---|
|  | A-1 | A-2 |
| Properties of Copolymer: | | |
| Butene-1 content (mol %) | 5.0 | 4.6 |
| Density (g/cm$^3$) | 0.906 | 0.909 |
| MFR (190° C.) (g/10 min) | 2.1 | 1.7 |
| Temperature of DSC maximum peak of fusion (°C.) | 92.9 | 96.5 |
| Heat of fusion at the peak/total heat of fusion ratio | 1.0 | 1.0 |
| Coefficient of variation of composition variation (Cx) | 0.18 | 0.20 |

(2) Preparation of laminate Film:

A resin composition comprising 98.0% of ethylene-butene-1 copolymer (A-1) and 2.0% of monoglycerol oleate was kneaded at 170° C. in an extruder having a diameter of 50 mm and an L/D ratio of 28.

Separately, propylene-butene-1 copolymer (B-1) having a butene-1 content of 17.3 mol % and a CXS of 29.6% which was prepared by the process described in JP-A-60-76515 was kneaded at 200° C. in an extruder having a diameter of 50 mm and an L/D ratio of 28.

Both the molten resins were introduced into a blown-film extruder with a three-layered blown-film die having a die diameter of 150 mm and a die lip of 1.2 mm (manufacturer: Placo Co., Ltd.) with copolymer (B-1) as an intermediate layer and copolymer (A-1) as upper and lower layers, and blown-film extrusion was conducted at a die temperature of 200° C. and a blow-up ratio of 3.0 to prepare a laminate film having a three-layer structure, each layer having a thickness of 5 μm to give a total thickness of 15 μm.

Various physical properties of the resulting film are shown in Table 2. The odor of the film was as low as giving rise to no problem on practical use.

EXAMPLE 2

A 15 μm thick laminate film was prepared in the same manner as in Example 1, except for replacing propylene-butene-1 copolymer (B-1) with propylene-butene-1-ethylene copolymer (B-2) having a butene-1 content of 12.5 mol %, an ethylene content of 1.4 mol %, and a CXS of 32.7% which was prepared by the process disclosed in JP-A-60-76515. The physical properties of the resulting film are shown in Table 2. The odor of the film was sufficiently low for practical use.

EXAMPLE 3

A 15 μm thick laminate film was prepared in the same manner as in Example 1, except for replacing ethylene-butene-1 copolymer (A-1) with copolymer (A-2). The physical properties of the resulting film are shown in Table 2. The odor of the film was sufficiently low for practical use.

EXAMPLE 4

A 15 μm thick laminate film was prepared in the same manner as in Example 1, except for replacing propylene-butene-1 copolymer (B-1) with propylene-ethylene copolymer (C-1) having an MFR (230° C.) of 3.0 g/10 min, an ethylene content of 7.0 mol %, and a DSC minimum peak of fusion at 137° C. ("SUMITOMO NORBLENE" produced by Sumitomo Chemical Co., Ltd.). The physical properties of the resulting film are shown in Table 2. The odor of the film was sufficiently low for practical use.

EXAMPLE 5

A 15 μm thick laminate film was prepared in the same manner as in Example 4, except for replacing ethylene-butene-1 copolymer (A-1) with copolymer (A-2). The physical properties of the resulting film are shown in Table 2. The odor of the film was sufficiently low for practical use.

EXAMPLE 6

A 15 μm thick laminate film was prepared in the same manner as in Example 1, except for replacing propylene-butene-1 copolymer (B-1) with ethylene-butene-1 copolymer (D-1) having an MFR (190° C.) of 2 g/10 min, an ethylene content of 93.2 mol %, a density of 0.900 g/cm$^3$, a DSC minimum peak of fusion at 115° C., and a CXS of 22% ("EXCELLEN VL200" produced by Sumitomo Chemical Co., Ltd.). The physical properties of the resulting film are shown in Table 2. The odor of the film was sufficiently low for practical use.

EXAMPLE 7

A 15 μm thick laminate film was prepared in the same manner as in Example 1, except for replacing propylene-butene-1 copolymer (B-1) with ethylene-butene-1 copolymer (D-2) having an MFR (190° C.) of 0.8 g/10 min, an ethylene content of 90.8 mol %, a density of 0.890 g/cm$^3$, a DSC minimum peak of fusion at 114° C., and a CXS of 43% ("EXCELLEN EUL130" produced by Sumitomo Chemical Co., Ltd.). The physical properties of the resulting film are shown in Table 2. The odor of the film was sufficiently low for practical use.

COMPARATIVE EXAMPLE 1

A 15 μm thick laminate film was prepared in the same manner as in Example 1, except for replacing ethylene-butene-1 copolymer (A-1) with an ethylene-vinyl acetate copolymer (EVA) having a vinyl acetate content of 15% and an MFR (190° C.) of 2.0 g/10 min ("EVATATE H2011" produced by Sumitomo Chemical Co., Ltd.).

The physical properties of the resulting film are shown in Table 3 below. The film gave off an acetic acid odor and had poor transparency. Therefore, the film was unacceptable for practical use.

COMPARATIVE EXAMPLE 2

A 15 μm thick film was prepared in the same manner as in Example 4, except for replacing ethylene-butene-1 copolymer (A-1) with propylene-ethylene copolymer (C-1). That is, the resulting film solely comprised copolymer (C-1). The physical properties of the film are shown in Table 3. While the odor of the film was sufficiently low, it was poor in transparency, softness, self-tack, and heat-sealing properties and was therefore unacceptable for practical use.

COMPARATIVE EXAMPLE 3

A 15 μm thick film was prepared in the same manner as in Example 6, except for replacing ethylene-butene-1 copolymer (A-1) with ethylene-butene-1 copolymer (D-1) having a Cx of 0.44. That is, the resulting film solely comprised copolymer (D-1). The physical properties of the film are shown in Table 3. While the odor of the film was sufficiently low, it was poor in transparency, softness, self-tack, and heat-sealing properties and was therefore unacceptable for practical use. It is noted that the Cx of the ethylene-butene-1 copolymer used is out of the range specified in the present invention.

COMPARATIVE EXAMPLE 4

A resin composition comprising 98.0% of ethylene-butene-1 copolymer (D-1) and 2.0% of monoglycerol oleate was kneaded at 170° C. in an extruder having a diameter of 50 mm and an L/D ratio of 28.

The molten resin and propylene-ethylene copolymer (C-1) in a molten state were fed to the same blown-film extruder as used in Example 1 with copolymer (C-1) as an intermediate layer and copolymer (D-1) as upper" and lower layers, and blown-film extrusion was conducted at a die temperature of 200° C. and a blow-up ratio of 3.0 to prepare a laminate film having a three-layer structure, each layer having a thickness of 5 μm to give a total thickness of 15 μm.

Various physical properties of the resulting laminate film are shown in Table 3. While the odor of the film was sufficiently low, it was poor in transparency, softness, self-tack, and heat-sealing properties and was therefore unacceptable for practical use. Similarly to Comparative Example 3, the Cx of the ethylene-butene-1 copolymer used is out of the range specified in the present invention.

TABLE 3-continued

|  | Compar. Example 1 | Compar. Example 2 | Compar. Example 3 | Compar. Example 4 |
|---|---|---|---|---|
| Heat-sealing strength (kg/15 mm) | 2.2 | 0.0 | 0.4 | 0.3 |

As described and demonstrated above, the present invention provides a wrapping film having not only suitability to automatic wrapping, i.e., slip, self-tack, heat-sealability, and softness, but also excellent transparency and high mechanical strength and is less odorous. While the invention has been described in detail and with reference to specific examples thereof, it will be apparent to one skilled in the art that various changes and modifications can be made therein without departing from the spirit and scope thereof.

What is claimed is:

1. A laminate film for wrapping which comprises a layer comprising (A) an ethylene-α-olefin copolymer having a coefficient of variation of composition distribution (Cx) represented by equation shown below of 0.40 or less and having an ethylene content of 50 mol % or more and an α-olefin content of from 2 to 20 mol %, having a density of from 0.870 to 0.915 g/cm$^3$, and showing its maximum peak of fusion at 60° C. or higher and less than 100° C. as measured with a differential scanning calorimeter, with the proportion of the heat of fusion at that peak in the total heat of fusion being at least 0.8

$$Cx = \sigma/SCB_{ave}$$

wherein σ is a standard deviation of composition distribution (1/1000 C), and $SCB_{ave}$ is an average of the number of short chain branchings per 1000 C (1/1000 C), and at least one layer selected from the group consisting of (B), (C) and (D);

(B) a propylene-α-olefin copolymer having a content of an α-olefin having 4 or more carbon atoms of from 8 to 35 mol %, an ethylene content of 5 mol % or less., and a cold xylene-soluble matter content of from 10 to 70% by weight;

(C) a propylene-ethylene copolymer having an ethylene

TABLE 2

|  | Example 1 | Example 2 | Example 3 | Example 4 | Example 5 | Example 6 | Example 7 |
|---|---|---|---|---|---|---|---|
| Layer Structure: |  |  |  |  |  |  |  |
| Both outer layers | A-1 | A-1 | A-2 | A-1 | A-2 | A-1 | A-1 |
| Intermediate layer | B-1 | B-2 | B-1 | C-1 | C-1 | D-1 | D-2 |
| Physical Properties: |  |  |  |  |  |  |  |
| Haze (%) | 1.0 | 1.1 | 1.5 | 1.1 | 1.2 | 1.5 | 1.8 |
| Tensile strength (kg/cm$^2$) (MD/TD) | 580/560 | 600/580 | 590/580 | 490/470 | 510/490 | 480/460 | 460/440 |
| Tensile elongation (%) (MD/TD) | 570/600 | 550/570 | 550/580 | 580/610 | 560/580 | 590/620 | 600/610 |
| Young's modulus (kg/cm$^2$) (MD/TD) | 1060/980 | 1050/980 | 1100/990 | 1080/1000 | 1070/1000 | 1030/960 | 1010/940 |
| Self-tack (kg/12 cm$^2$) | 0.76 | 0.75 | 0.72 | 0.78 | 0.77 | 0.80 | 0.81 |
| Heat-sealing strength (kg/15 mm) | 3.2 | 3.2 | 3.1 | 3.3 | 3.3 | 3.2 | 3.1 |

TABLE 3

|  | Compar. Example 1 | Compar. Example 2 | Compar. Example 3 | Compar. Example 4 |
|---|---|---|---|---|
| Layer Structure: |  |  |  |  |
| Both outer layers | EVA | C-1 | D-1 | D-1 |
| Intermediate layer | C-1 | C-1 | D-1 | C-1 |
| Physical Properties: |  |  |  |  |
| Haze (%) | 4.5 | 3.8 | 4.2 | 4.0 |
| Tensile strength (kg/cm$^2$) (MD/TD) | 430/410 | 560/520 | 450/440 | 480/450 |
| Tensile elongation (%) (MD/TD) | 510/520 | 330/350 | 390/410 | 370/380 |
| Young's modulus (kg/cm$^2$) (MD/TD) | 1260/1050 | 1840/1790 | 1330/1300 | 1480/1450 |
| Self-tack (kg/12 cm$^2$) | 0.75 | 0.05 | 0.53 | 0.47 | content of from 3 to 12 mol % and a minimum peak of fusion at a temperature of 130° C. or more as measured with a differential scanning calorimeter; and (D) an ethylene-butene-1 copolymer having an ethylene content of 50 mol % or more, a density of from 0.870 to 0.910 g/cm$^3$, a peak of fusion at a temperature of 100° C. or more as measured with a differential scanning calorimeter, and a cold xylene-soluble matter content of from 5 to 50% by weight.

2. A laminate film for wrapping as claimed in claim 1, wherein said wrapping is stretch-wrapping.

3. A laminate film for wrapping as claimed in claim 1, wherein said at least one layer is a layer comprising (B) a propylene-α-olefin copolymers having a content of an α-olefin having 4 or more carbon atoms of from 8 to 35 mol %, an ethylene content of 5 mol % or less, and a cold xylene-soluble matter content of from 10 to 70% by weight.

4. A laminate film for wrapping as claimed in claim 1, wherein said at least one layer is a layer comprising (C) a propylene-ethylene copolymer having an ethylene content of from 3 to 12 mol % and a minimum peak of fusion at a temperature of 130° C. or more as measured with a differential scanning calorimeter.

5. A laminate film for wrapping as claimed in claim 1, wherein said at least one layer is a layer comprising (D) an ethylene-butene-1 copolymer having an ethylene content of 50 mol % or more, a density of from 0.870 to 0.910 g/cm$^3$, a peak of fusion at a temperature of 100° C. or more as measured with a differential scanning calorimeter, and a cold xylene-soluble matter content of from 5 to 50% by weight.

* * * * *